United States Patent [19]
Matteucci

[11] Patent Number: 5,421,095
[45] Date of Patent: Jun. 6, 1995

[54] PROCEDURE FOR TRANSMISSION OF INFORMATION IN ALIGNING EQUIPMENT FOR MOTOR VEHICLES, AND ALIGNING EQUIPMENT FOR CARRYING OUT THE PROCEDURE

[75] Inventor: Marco Matteucci, Riosaliceto, Italy

[73] Assignee: G.S. S.r.L., Correggio, Italy

[21] Appl. No.: 169,067

[22] Filed: Dec. 20, 1993

[30] Foreign Application Priority Data

Feb. 3, 1993 [IT] Italy ................. M093A0010

[51] Int. Cl.⁶ .................. G01B 11/275; G01B 7/315
[52] U.S. Cl. .................. 33/203; 33/203.15; 364/559
[58] Field of Search ............ 33/203, 203.12, 203.13, 33/203.14, 203.15, 203.16, 203.17, 203.18, 203.19, 203.2, 203.21; 364/559, 551.01

[56] References Cited

U.S. PATENT DOCUMENTS

| | | | |
|---|---|---|---|
| 4,192,074 | 3/1980 | Chang | 33/203.15 |
| 4,336,658 | 6/1982 | January et al. | 33/203.18 |
| 4,718,759 | 1/1988 | Butler | 33/203.18 |
| 5,056,233 | 10/1991 | Hechel et al. | 33/203 |
| 5,218,556 | 6/1993 | Dale, Jr. | 33/203.18 |
| 5,301,110 | 4/1994 | Spainhour et al. | 33/203.18 |
| 5,313,711 | 5/1994 | Kling, III et al. | 33/203.18 |
| 5,329,452 | 7/1994 | Kercheck et al. | 33/203.12 |

*Primary Examiner*—Christopher W. Fulton
*Attorney, Agent, or Firm*—Browdy and Neimark

[57] ABSTRACT

The invention refers to procedure and equipment wherein there is a bi-directional communication between a central processing unit (3) and peripheral processing units (6a, 6b, 6c, 6d) associated to measuring devices (1) applied on vehicle wheels by means of a ring structure in which the data circulates in only one direction with a mono-directional or simplex transmission in the single ring tracts between one unit and an immediately successive one. A screened cable or an infrared cable is used.

8 Claims, 2 Drawing Sheets

PROCEDURE FOR TRANSMISSION OF INFORMATION IN ALIGNING EQUIPMENT FOR MOTOR VEHICLES, AND ALIGNING EQUIPMENT FOR CARRYING OUT THE PROCEDURE

BACKGROUND OF THE INVENTION

The invention relates to a procedure for information transmission in aligning equipment for motor vehicles, and aligning equipment for carrying out the procedure.

The prior art embraces procedures and equipment for measuring the angles that motor vehicle wheels assume with respect to the geometrical axis of the vehicles, and/or with the drive axis and the ground, which are commonly referred to as toe-in, wheel pitch angle, the angle of incidence of the wheel upright and the stub axle tilt angle.

Further, indications are sent to an operator to correct any erroneous adjustments and to return the angles to their optimal value.

Toe-in and pitch transducers are used to effect the above-mentioned measurements, associated to applied measurement devices applied to the rims of the vehicle wheels.

Such measuring devices are provided with an internal processing unit which communicates with a central processing unit controlled by a special program and which is aimed at processing the information received in order to provided useful information to the operator, by means of a screen, as taught in U.S. Pat. No. 4,594,789.

The exchange of information between the central processing unit and the peripheral units associated to the single measurement devices is rather complex, however, both because of the need for multi-core connection cables which can easily get tangled up, and because the actual transmission of the information is in itself complex.

Indeed, three lines are necessary to set up bidirectional communication between the central and the peripheral units, one further line for transmission from the peripherals to the central unit, and yet another for transmission control and selection of the unit concerned in the transmission.

The principal aim of the present invention is to obviate the above-mentioned drawbacks by providing a procedure and equipment for simplifying the above operations, by the use of only one serial line for bidirectional communication between a central processing unit and peripheral processing units.

A further aim is to avoid the use of multipolar cables in the said transmission.

SUMMARY OF THE INVENTION

The stated aims are fully attained by the aligning equipment for motor vehicles, object of the present invention, characterised in the attached claims and in particular in that the dialogue between the central processing unit and the peripheral units takes place by means of a loop structure wherein the information travels one way only, realising an overall bidirectional whole, while simplex in the single tracts of the loop between one processor unit and an immediately successive processor unit.

A further aim of the invention is a procedure for transmission of information in aligning equipment for motor vehicles, as characterised in the following claims.

BRIEF DESCRIPTION OF THE DRAWINGS

Further characteristics and advantages of the present invention will better emerge from the detailed description that follows, of a preferred but non-exclusive embodiment here illustrated in the form of a non-limiting example in the accompanying drawings, in which.

DESCRIPTION OF THE PREFERRED EMBODIMENTS

Figure 1:
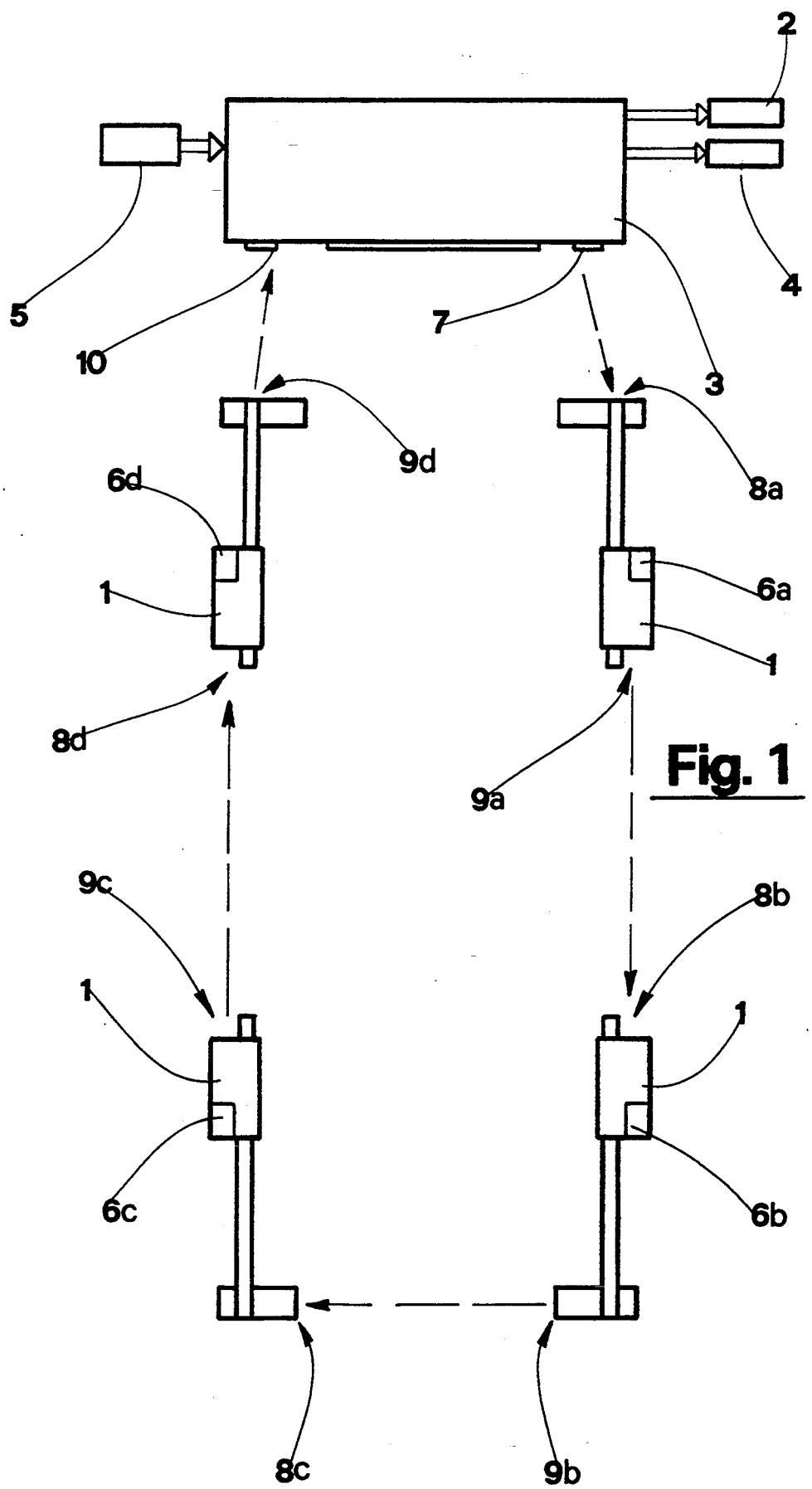
FIG. 1 gives a full schematic view of the equipment.

With reference to FIG. 1, 1 denotes four measuring devices aplied to the four wheels of a vehicle (not illustrated).

The measuring devices 1 take a series of angular measurements, such as: toe-in, angle of wheel tilt, angle of incidence of upright, stub angle, using known means comprising sensors or toe-in and tilt transducers. The measuring devices 1 are conventionally internally equipped with peripheral processors to communicate with the central processor 3.

The angular measurements made by the measuring devices 1 for each of the four wheels are sent to the central processor 3 which, commanded by a program, processes the measurements and via a monitor 2 communicates to the operator the above-mentioned angles together with useful indications for correcting any erroneous angle values, changing them to prescribed values.

The central processor 3, for example, indicates the optimal angular values, giving a visualising the modalities and intervention points, diagnoses the state of the vehicle wheels to be aligned and may contain in its memory a data bank comprising all of the interventions performed on each vehicle.

The central processor 3 dialogues with the peripheral units such as the monitor 2, one or more printers 4, magnetic memory units, keyboards or wands 5, and any external processor in order to function also as a remote unit, for example via a modem.

The measures read by the single toe-in sensors (of known type) are sent to the central processor 3 to be processed by the memory-resident program therein in order to obtain information on: four-wheel toe-in; anterior or posterior toe-in, thrust angle and anterior and posterior misalignment.

The tilt sensors, also of known type, are used both to measure wheel tilt and to verify the condition or levelling of the measuring devices 1 constrained to the wheel rim by hooking means.

The measuring devices 1 receive information from the central processor 3 in order to synchronise all device functioning and to select different known functioning modalities, such as: wait, calibration, rim compensation procedure, measurement.

Serial type bidirectional communication between the central processor 3 and the peripheral units connected to the measuring devices is made using a closed loop structure wherein the data travels in one direction, clockwise in the illustrated example, from the central processor 3 to a first peripheral unit 6a, then on to a second 6b, a third 6c and a fourth 6d, from whence it returns to the central processor 3.

The data accumulated along the loop is transmitted back to the central processor 3 by the fourth peripheral unit 6d, is processed thereat with selected data being sent therefrom in the next cycle to the single peripheral units by transmission to the first of them 6a.

The bidirectional communication is therefore essentially monodirectional or simplex in the single tracts of the loop, from one processing unit to the next.

Such communication is compatible with RS232 series standard. Considerations on the necessity of data transmission speed and the transmission means passband have led to the use of a 9600 bit/s communication speed, with words of 8 bits, 1 stop bit and no parity, but other transmission types could be used instead.

The single peripheral processors 6a-6d manage communication between the measuring devices 1 and the central processor 3 and among the various devices positioned along the loop. They also process the tilt sensors measurements, carrying out an analogic/digital conversion, and generate toe transducer synchronisation signals and can manage a monitor and keyboard interface with the operator.

As can be seen in FIG. 1, the data travels clockwise from a transmission pin 7 of a serial port in the central processor 3 to a receiver connection 8a in the first measuring device of the loop, which retransmits the received data plus additional data to the next measurement device in the loop through its own transmission connection 9a.

The communication continues thus through the further receiver and transmission connections and then at the end returns to the central processor 3 through a receiver pin 10 in the serial port.

Figure 2:
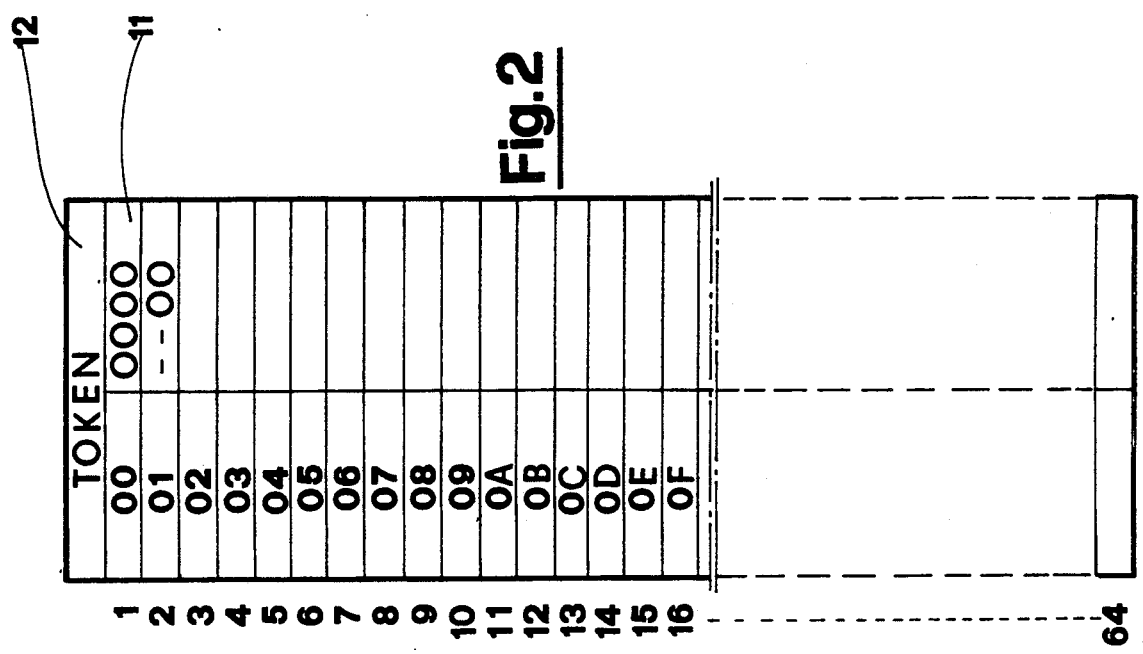
FIG. 2 shows the communication scheme.

FIG. 2 shows the transmission scheme, constituted by 64 8-bit words and a further 8-bit word or start word 12, techically known as a token, which constitutes the start signal emitted by the central processor 3.

Each 8-bit word comprises 4 bits of address (in FIG. 2 numbered hexadecimally from 00 to 0F) and 4 data bits, structured as follows: the four data bits of the first word contain a synchronisation signal constituted in all cases by four zeroes 0000; the four data bits of the second word are constituted by 2 unit identification bits, 00, 01, 10, 11 in binary code, and 2 free bits which can be used for other purposes; the bits of the third word contain calibration and levelling information, which the bits of the fourth word contain four data sign flags. The bits of the remaining words are sub-divided into four groups corresponding to 4 different types of data: the first group comprises the fifth, the sixth and the seventh word; the second group comprises the eighth, the ninth and the tenth word; the third group comprises the eleventh, the twelfth and the thirteenth word; the fourth group comprises the fourteenth, the fifteenth and the sixteenth word. The sixteen 8-bit words are repeated for each of the four devices having the same structure.

As regards to the way the data is exchanged along the loop, the first peripheral processor 6a, identified by the binary code 00 receives the start word containing the code of the operation that the central processor 3 orders the peripheral units to carry out.

On the basis of the received code the peripheral unit 6a processes the signals of its own transducers and transmits them to the successive unit 6b, also transmitting the start word to it and attaching its data with sixteen 8-bit words.

To each 4-bit address word the unit 6a associates the corresponding data in the same way as has been described above: the synchronisation signal 0000 is associated to the address 00, its own two identification bits 00 are attached to the address 01, together with another two bits which can be used for distance commands to the central unit 3; four bits indicating the levelling condition of the unit and the state of calibration are associated to the hexadecimal address 02; to the 03 address 4 bits are associated, which bits are used for the data sign flag sent to the successive addresses, and to the addresses from 04 to 0F data groups relative to its own sensors of angle and inclination are associated.

The successive unit 6b receives the start word together with the other 16 words of the unit 6a, adds its own 16 words and relays all to unit 6c, which adds another 16 words before transmitting it to unit 6d, which, after having added its own 16 words, transmits the entire data train to the central unit 3.

The central unit 3, after having ascertained the validity of the data by comparing the start word sent out with that received, memorises the data received on a record and sends a new start word with new instructions for the peripheral units (for example the wait, calibration, rim compensation, measurement instructions).

The operator can intervene on the central unit 3 to modify the sequence of the start words sent and also to turn off the measuring devices 1, while keeping the receiver connections active.

The above-described communication scheme guarantees full functioning compatibility both when a transmitting means constituted by a cable is used and when infrared carriers are used.

In the last case the data travels on a carrier emitted by a plurality of infrared LEDs piloted by a periodic signal at 120 KHz.

Figure 3:
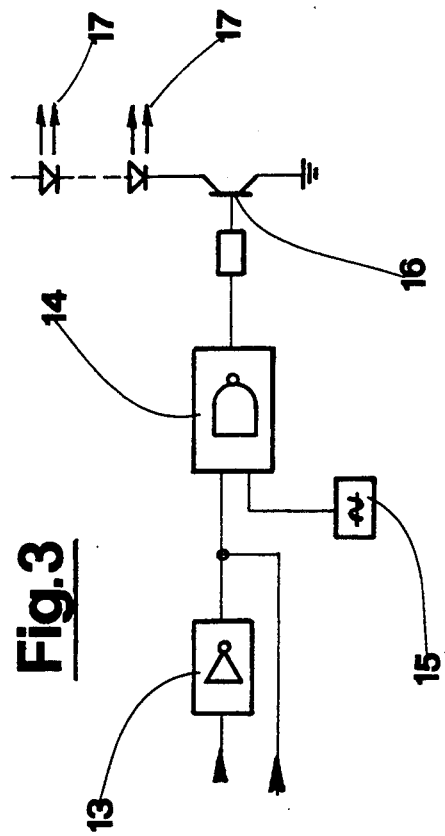
FIGS. 3 and 4 schematically show first an infrared transmitter and then an infrared receiver, both being constituent parts of the equipment.

FIG. 3 shows a block diagram of the transmitting circuit comprising a level converter 13 between RS232 signals and TTL signals in input to a stage modulator 14 (logical or NAND) which also receives in input a carrier generated by an oscillator 15. Final transmission and pilot stage 16 of infrared LEDs 17 are supplied by the carrier modulated by the signal.

Figure 4:
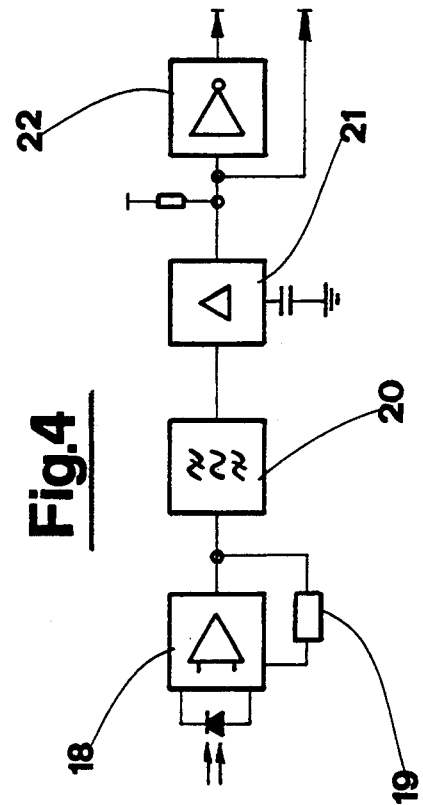

FIG. 4 shows a block diagram of the receiver circuit, exhibiting a detector 21 able to reconstruct the signal by eliminating the 120 KHz carrier.

The receiver comprises a low-noise amplifier 18 with a device 19 for automatically regulating the gain, a filter 20 of the passband type, a detector 21 and a level converter 22 between TTL and RS232 signals for interfacing with the central unit 3.

What is claimed is:

1. In wheel aligning equipment for motor vehicles of the type including reading means for reading a plurality of parameters relating to wheels, the improvement wherein the reading means comprises:
   at least one central processor commanded by a management program;
   data transmission means coupled to the central processor;
   a plurality of peripheral units coupled to the data transmission means, each one of the peripheral units including a respective measuring device, the measuring device further including sensors and a respective peripheral processing unit dialoging with the central processor and with other peripheral processing units of measuring devices of other ones of the peripheral units by means of a transmission protocol and via the data transmission means;
wherein a dialog between the central processor and the peripheral processors is carried out through a loop structure in which data travels through the data transmission means in a series of data transmission sequences and in one direction only, from the central processor to a first peripheral processor, then on to a second peripheral processor, then on to a third peripheral processor, and so on until the data arrives at an kth final peripheral processor, which final peripheral processor transmits to the central processor data that has been accumulated during each of the series of the data transmission sequences to and from each peripheral processor;
whereby data transmission is monodirectional in a loop structure but communication is bidirectional.

2. The improvement according to claim 1, wherein the data transmission means comprises one or more screened cables disposed between the processor units.

3. The improvement according to claim 1, wherein the data transmission means employs a modulated infrared carrier between the processor units and the data transmission means further comprises at least one infrared transmitter and at least one infrared receiver.

4. The improvement according to claim 1, wherein data transmission takes places via a transmission protocol comprising n groups of m words, n being a number of measuring devices and m being a number of words reserved to each measuring device, with an addition of a start word each of the m words being formed by address bits and by data bits, there being among the m words at least one word having data bits containing a synchronization code of a measuring device and a further word having data bits which encode the measuring device.

5. A procedure for transmitting data in alignment equipment for motor vehicles, where the alignment equipment is provided with reading means for reading a plurality of wheel parameters, the procedure comprising the steps of:
providing a central processor;
providing a plurality of peripheral processors associated with vehicle wheel measuring devices, the plurality including k peripheral processors, where k is an integer;
connecting the processors in a closed loop configuration;
designating the peripheral processors of the closed loop with successive ordinal numbers, such that a first peripheral processor and an kth peripheral processor are connected to the central processor;
transmitting data around the loop from the central processor to the first peripheral processor, from the first peripheral processor to the second peripheral processor, and so on sequentially around the loop;
whereby all of the data which has been accumulated during transmission along the loop structure is obtained by a sum of single processor-to-processor monodirectional tracts in the closed loop configuration and the central processor transmits data to the first peripheral processor and receives data from the kth peripheral processor.

6. The procedure according to claim 5, wherein data transmission takes places via a transmission protocol comprising n groups of m words, n being a number of measuring devices and m being a number of words reserved to each measuring device, with an addition of a start word each of the m words being formed by address bits and by data bits, there being among the m words at least one word having data bits containing a synchronization code of a measuring device and a further word having data bits which encode the measuring device.

7. The procedure of claim 5, wherein a communication between the processors is of serial type, compatible with RS232 standard.

8. A procedure for transmitting data in alignment equipment for motor vehicles, where the alignment equipment is provided with reading means for reading a plurality of wheel parameters, the procedure comprising the steps of:
providing a central processor; and
providing a plurality of peripheral processors associated with vehicle wheel measuring devices;
wherein data transmission takes places via a transmission protocol comprising n groups of m words, n being a number of measuring devices and m being a number of words reserved to each measuring device, with an addition of a start word each of the m words being formed by address bits and by data bits, there being among the m words at least one word having data bits containing a synchronization code of a measuring device and a further word having data bits which encode the measuring device.

* * * * *